(12) United States Patent
Fu et al.

(10) Patent No.: US 6,903,054 B2
(45) Date of Patent: Jun. 7, 2005

(54) RESERVOIR TREATMENT FLUIDS

(75) Inventors: Diankui Fu, Missouri City, TX (US); Marieliz Garcia-Lopez de Victoria, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 321 days.

(21) Appl. No.: 10/231,569

(22) Filed: Aug. 30, 2002

(65) Prior Publication Data

US 2004/0045710 A1 Mar. 11, 2004

(51) Int. Cl.$^7$ .................................................. C09K 3/00
(52) U.S. Cl. ....................... 507/244; 507/235; 507/236; 507/237; 507/238; 507/260; 507/90
(58) Field of Search .................................. 507/244, 241, 507/235, 236, 237, 238, 260, 90

(56) References Cited

U.S. PATENT DOCUMENTS

| | | | |
|---|---|---|---|
| 5,529,125 A | 6/1996 | Di Lullo Arias et al. | |
| 5,979,557 A | 11/1999 | Card et al. | |
| 6,258,859 B1 | 7/2001 | Dahayanake et al. | |
| 6,399,546 B1 | 6/2002 | Chang et al. | |
| 6,762,154 B2 * | 7/2004 | Lungwitz et al. | 507/131 |
| 2002/0033260 A1 | 3/2002 | Lungwitz et al. | 166/278 |
| 2002/0132741 A1 | 9/2002 | Chang et al. | 507/240 |
| 2003/0139298 A1 * | 7/2003 | Fu et al. | 507/200 |

FOREIGN PATENT DOCUMENTS

WO  03/054352  7/2003

* cited by examiner

*Primary Examiner*—Philip C. Tucker
(74) *Attorney, Agent, or Firm*—Thomas O. Mitchell; Robin Nava; Brigitte L. Echols

(57) ABSTRACT

A method of treating a hydrocarbon-containing formation is disclosed. The method includes injecting a well treating fluid into a well, wherein the well treating fluid includes a self-diverting acid that includes about 1% to 30% by weight of at least one acid selected from the group consisting of hydrochloric acid, sulfuric acid, phosphoric acid, formic acid, acetic acid, citric acid, maleic acid, hydrofluoric acid and mixtures thereof; and about 1% to 20% by volume of at least one viscoelastic surfactant selected from a family of compounds described by

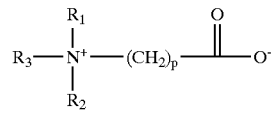

where $R_3$ contains at least 10 carbon atoms, p=1–6, $R_2$ contains 1–6 carbon atoms and $R_1$ contains 1–6 carbon atoms; and about 0.7% to 20% by weight scale inhibitor.

10 Claims, 4 Drawing Sheets

RESERVOIR TREATMENT FLUIDS

BACKGROUND OF INVENTION

1. Field of the Invention

The invention relates generally to the exploitation of hydrocarbon-containing formations. More specifically, the invention relates to fluids that are used to optimize and/or enhance the production of hydrocarbon from a formation ("well completion fluids").

2. Background Art

Hydrocarbons (oil, natural gas, etc.) are typically obtained from a subterranean geologic formation (i.e., a "reservoir") by drilling a well that penetrates the hydrocarbon-bearing formation. In order for hydrocarbons to be "produced," that is, travel from the formation to the wellbore (and ultimately to the surface), there must be a sufficiently unimpeded flowpath from the formation to the wellbore. This flowpath is through the formation rock, e.g., solid carbonates or sandstones having pores of sufficient size, connectivity, and number to provide a conduit for the hydrocarbon to move through the formation.

Recovery of hydrocarbons from a subterranean formation is known as "production." One key parameter that influences the rate of production is the permeability of the formation along the flowpath that the hydrocarbon must travel to reach the wellbore. Sometimes, the formation rock has a naturally low permeability; other times, the permeability is reduced during, for instance, drilling the well. When a well is drilled, a drilling fluid is often circulated into the hole to contact the region of a drill bit, for a number of reasons such as: to cool the drill bit, to carry the rock cuttings away from the point of drilling, and to maintain a hydrostatic pressure on the formation wall to prevent production during drilling. During well operations, drilling fluid can be lost by leaking into the formation. To prevent this, the drilling fluid is often intentionally modified so that a small amount leaks off and forms a coating on the wellbore surface (often referred to as a "filtercake"). Once drilling is complete, and production is desired, this coating or filtercake must be removed.

Additionally, during production, water containing a number of dissolved salts is often coproduced with the hydrocarbon. Especially when the formation is a carbonate, calcium cations are prevalent, as are carbonate and phosphate anions. The combination products of calcium cation with carbonate anion or phosphate anion will precipitate from the water in which the ions are carried to form "scale" deposits when the concentrations of these anions and cations exceed the solubility of the reaction product. The formation of scale can slow oil production rate and, in extreme circumstances, stop production completely.

A variety of solutions to prevent the formation of scales in a wellbore have been proposed. One typical method is to inject or "squeeze" a solution of a "scale inhibitor" such as a polyphosphonate into the reservoir rock, often utilizing a brine or water afterflush, and allow the absorbed inhibitor to desorb during fluids production. In practice, however, the desorption process is often found to be quite rapid once production is resumed, thereby necessitating frequent shutdowns for additional treatments. This has the effect of substantially reducing the productivity of the well.

Techniques used to increase the net permeability of the reservoir are referred to as "stimulation" techniques. Typically, stimulation techniques include methods such as: (1) injecting chemicals into the wellbore to react with and dissolve the damage (e.g., scales, filtercakes); (2) injecting chemicals through the wellbore and into the formation to react with and dissolve small portions of the formation to create alternative flowpaths for the hydrocarbon; and (3) injecting chemicals through the wellbore and into the formation at pressures sufficient to actually fracture the formation, thereby creating a large flow channel through which hydrocarbon can more readily move from the formation into the wellbore.

In particular, methods to enhance the productivity of hydrocarbon wells (e.g., oil wells) by removing (by dissolution) near-wellbore formation damage or by creating alternate flowpaths by fracturing and dissolving small portions of the formation at the fracture face are respectively known as "matrix acidizing," and "acid fracturing." Generally speaking, acids, or acid-based fluids, are useful in this regard due to their ability to dissolve both formation minerals (e.g., calcium carbonate) and contaminants (e.g., drilling fluid coating the wellbore or penetrated into the formation) introduced into the wellbore/formation during drilling or remedial operations.

Both the inhibition or removal of filtercakes and scales, and fluid placement are key concerns in well completion operations. Typical prior art techniques involve a multiple stage process. For example, in a typical prior art application, during completion operations, an acid treatment is performed, followed by a spacer. After this treatment, the well is cleaned, and a scale inhibitor is injected. A spacer is then injected, followed by a diverter. The process of additive (which may be an acid or a diverter, for example), spacer, additive, spacer, is repeated until all of the required treatments have been finished. This is a costly and time-consuming procedure.

Typically, matrix acidizing treatments have three major limitations: (1) limited radial penetration; (2) non-optimal axial distribution; and (3) corrosion of the pumping and well bore tubing. The first problem, limited radial penetration, occurs because once the acid is introduced into the formation (or wellbore), the acid reacts very quickly with the wellbore coating or formation matrix (e.g., sandstone or carbonate). In the case of treatments within the portion of the formation (rather than wellbore treatments), the formation near the wellbore that first contacts the acid is adequately treated. However, because most or all of the acid reacts upon contact, portions of the formation more distal to the wellbore (as one moves radially outward from the wellbore) remain untouched by the acid.

For instance, sandstone formations are often treated with a mixture of hydrofluoric and hydrochloric acids at very low injections rates (to avoid fracturing the formation). This acid mixture is often selected because it will dissolve clays (found in drilling mud) as well as the primary constituents of naturally occurring sandstones (e.g., silica, feldspar, and calcareous material). In fact, the dissolution is so rapid that the injected acid is essentially spent by the time it reaches a few inches beyond the wellbore. As a result, over 100 gallons of acid per foot is required to fill a region five feet from the wellbore (assuming 20% porosity and 6-inch wellbore diameter).

Similarly, in carbonate systems, the preferred acid is hydrochloric acid, which again, reacts so quickly with the limestone and dolomite rock that acid penetration is limited to between a few inches and a few feet. In fact, due to such limited penetration, it is believed matrix treatments are limited to bypassing near-wellbore flow restrictions—that is, they do not provide significant stimulation beyond what is achieved through (near-wellbore) damage removal. Yet damage at any point along the hydrocarbon flowpath can impede flow (hence production). Therefore, because of the prodigious fluid volumes required, these treatments are severely limited by their cost.

A second major problem that severely limits the effectiveness of matrix acidizing technology, is non-optimal axial distribution. This problem relates to the proper placement of the acid-containing fluid—i.e., ensuring that it is delivered to the desired zone (that is, the zone that needs stimulation) rather than another zone.

More particularly, when a hydrocarbon-containing carbonate formation is injected with acid (e.g., hydrochloric acid), the acid begins to dissolve the carbonate. As acid is pumped into the formation, a dominant channel through the matrix is inevitably created. As additional acid is pumped into the formation, the acid naturally flows along that newly created channel—i.e., the path of least resistance—and, therefore, leaves the rest of the formation untreated. This, of course, is undesirable. It is exacerbated by intrinsic heterogeneity with respect to permeability (common in many formations)—this occurs to the greatest extent in natural fractures in the formation and due to high permeability streaks.

Again, these regions of heterogeneity in essence attract large amounts of the injected acid, hence keeping the acid from reaching other parts of the formation along the wellbore—where it is actually needed most. Thus, in many cases, a substantial fraction of the productive, oil-bearing intervals within the zone to be treated are not contacted by acid sufficient to penetrate deep enough (laterally in the case of a vertical wellbore) into the formation matrix to effectively increase its permeability and therefore its capacity for delivering oil to the wellbore.

The problem of proper placement is significant in these systems because the injected fluid preferentially migrates to higher permeability zones (the path of least resistance) rather than to the lower permeability zones—yet it is those latter zones which require the acid treatment (i.e., because they are low permeability zones, the flow of hydrocarbon through them is restricted). In response to this problem, numerous, disparate techniques have evolved to achieve more controlled placement of the fluid—i.e., to divert the acid away from naturally high permeability zones and zones already treated and towards the regions of interest. A variety of prior art techniques (including emulsified acid systems, foamed systems, mechanical systems, and gelling agents) have been developed to control acid placement.

It has been difficult to find systems compatible over a wide range of temperatures with the wide variety of additives that are commonly used in well completion fluids that are suitable for inhibiting scale formation and can be properly, placed (i.e., self diverting).

Accordingly, what is desired are fluids that can inhibit the formation of scales and can be easily "spotted" or placed in the wellbore over the entire length of the desired zone. In addition, what is desired are fluids that are compatible with a wide range of additives over a broad range of temperatures and concentrations.

SUMMARY OF INVENTION

In one aspect, the present invention relates to a method of treating a hydrocarbon-containing formation. The method includes injecting a well treating fluid into a well, wherein the well treating fluid includes a self-diverting acid that includes about 1% to 30% by weight of at least one acid selected from the group consisting of hydrochloric acid, sulfuric acid, phosphoric acid, formic acid, acetic acid, citric acid, maleic acid, hydrofluoric acid and mixtures thereof; and about 1% to 20% by volume of at least one viscoelastic surfactant selected from a family of compounds described by

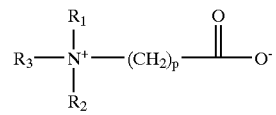

where $R_3$ contains at least 10 carbon atoms, $p=1-6$, $R_2$ contains 1–6 carbon atoms and $R_1$ contains 1–6 carbon atoms; and about 0.7% to 20% by weight scale inhibitor.

In another aspect, the present invention relates to a reservoir treatment fluid for use in a hydrocarbon-containing formation including a self-diverting acid, wherein the self diverting acid includes about 1% to 30% by weight of at least one acid selected from the group consisting of hydrochloric acid, sulfuric acid, phosphoric acid, formic acid, acetic acid, citric acid, maleic acid, hydrofluoric acid and mixtures thereof; and about 1% to 20% by volume of at least one viscoelastic surfactant selected from a family of compounds described by

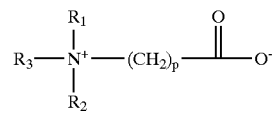

where $R_3$ contains at least 10 carbon atoms, $p=1-6$, $R_2$ contains 1–6 carbon atoms and $R_1$ contains 1–6 carbon atoms; and about 0.7% to 20% by weight scale inhibitor, wherein the scale inhibitor is a phosphorous-containing compound.

Other aspects and advantages of the invention will be apparent from the following description and the appended claims.

DETAILED DESCRIPTION

Figure 1:
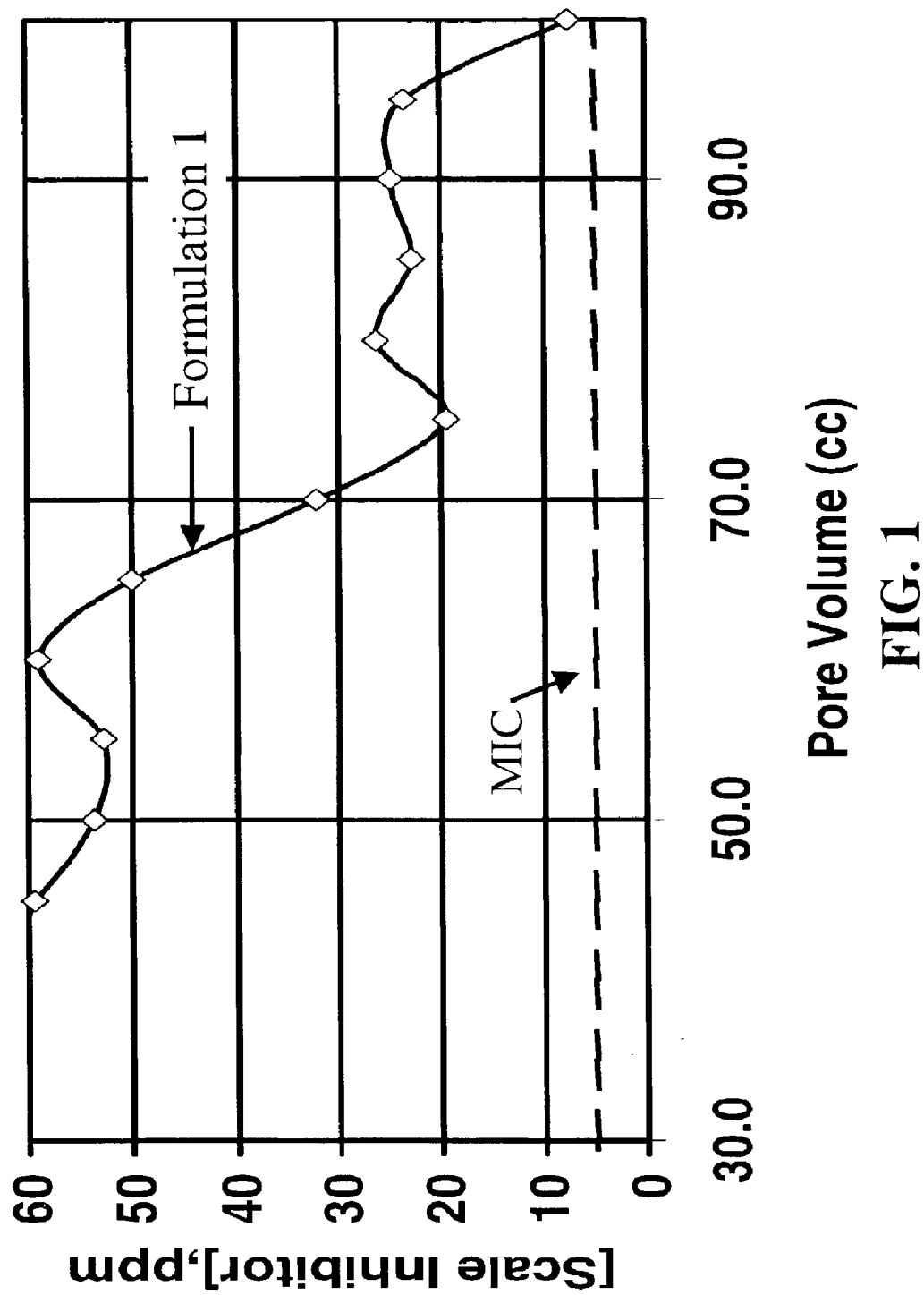
FIG. 1 shows a plot of scale inhibitor concentration in various wash out fractions versus total fluid volume for a fluid in accordance with one embodiment of the present invention.

In one aspect, the present invention discloses reservoir treatment fluids for use in hydrocarbon-containing formations. The fluids are relatively easy to place, work to prevent scale formation, are compatible with a broad range of additives, and function at a variety of temperatures. In one embodiment, the fluid may be used as a scale inhibitor and acid stimulator.

In particular embodiments, a fluid of the present invention comprises a mixture of a self diverting acid and a scale inhibitor. Both the self diverting acid and the scale inhibitor are known separately in the prior art.

Self diverting acid, such as viscoelastic diverting acid (VDA), is a term given to a class of compounds that exhibit reversible gelling behavior—that is, the fluid can be made to gel, then deliberately be un-gelled as needed. The ability to controllably gel and un-gel is important in fluid placement. Being able to gel, the VDA minimizes the axial distribution and radial penetration problems described above. Because the VDA forms a gel upon acid reaction with the formation, the VDA prevents additional, unneeded acid from entering the treated zones in the formation. U.S. Pat. No. 6,399,546, which is assigned to the assignee of the present invention, discusses VDA in detail, and is hereby incorporated by reference.

In embodiments of the present invention, the VDA comprises a mixture of a surfactant from a particular family of zwitterionic viscoelastic surfactants (VES) with particular mineral or organic acids (e.g., hydrochloric acid, hydrofluoric acid, sulfuric, phosphoric, formic, acetic, citric, maleic acids, and mixtures thereof). Note that hydrofluoric acid is preferred for silicate formations but not preferred for carbonate formations because of the chelating effect calcium has on fluorine.

A structure for surfactants within the scope of the present invention may be written generically as:

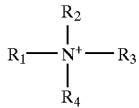

Thus, the primary surfactant can be represented by the general formula in which $R_1$ can be any hydrophobic chain of greater than about 10 carbon atoms—what is important is that its hydrophobicity is roughly the same as the embodiments shown below; whether it includes some hydrophilic functionalities is less important than overall chain length and overall hydrophobicity. Importantly, $R_1$ may have a variety of different functional groups.

The groups denoted as $R_2$ and $R_4$ may be the same or different and are small (about 1–6 carbons) hydrocarbon groups—branched or straight chain, saturated or unsaturated. They can also be hydroxyalkyl groups (e.g., $CH_2OH$ or $CH_2CH_2OH$). The group denoted as $R_3$ is, in the preferred embodiments, $—(CH_2)_nCOO^-$ in which n is about 1–6. In other embodiments, the carboxylate group can be replaced by phosphate, phosphonate, sulfonate, or sulfate, for instance—what is crucial for this particular portion of the molecule is not the precise chemical structure, but its acid-base behavior. Accordingly, systems having similar acid-base behavior as the preferred embodiments, certainly lie within the scope of the present invention.

The hydrophobic tails of the surfactants promote aggregation or self-partitioning, which in turn leads to gel formation. These groups should be sufficiently hydrophobic to enable gel formation to occur, but not so hydrophobic that the molecules cannot be disaggregated during pumping and initial migration into the formation. While the precise mechanisms for the gelling and ungelling are not known, electrostatic repulsion is believed to play a role. Between the quaternary amine and the carboxylate group is preferably a relatively small alkyl chain (e.g., p=1–6). In addition, other co-surfactants such as aromatic sulfonates may be included in the VDA.

A more specific class of suitable surfactants may be described as:

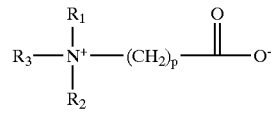

In these surfactants, $R_3$ is a relatively long hydrophobic chain (typically greater than about 10 carbons), $R_1$ and $R_2$ are typically chains including 1–6 carbons, and p is 1–6.

A preferred family of suitable viscoelastic surfactants for use in a VDA is shown below:

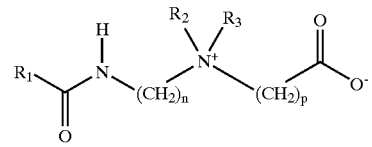

Viscoelastic surfactants that are suitable for embodiments of the present invention include those in which $R_1$ is an alkene side chain containing 16–26 carbon atoms (not counting the carbonyl carbon atom), n=2–10, and p=1–6, and in which $R_2$ and $R_3$ each contain 1–6 carbon atoms, and mixtures of these compounds. More preferred surfactants are those in which the $R_1$ alkenyl side chain contains 12–22 carbon atoms (not counting the carbonyl carbon atom), n=3–5, and p=1–3, and in which $R_2$ and $R_3$ each contain 1 carbon atom (e.g., $CH_2OH$ or $CH_3$), and mixtures of these compounds.

Two preferred examples of viscoelastic surfactants are betaines called, respectively, BET-O and BET-E. The surfactant in BET-O-30 is shown below. BET-O-30 can be obtained from Rhodia, Inc. (Cranbury, N.J., U.S.A.) under the trade name Mirataine BET-O-30™. It contains an oleyl acid amide group (i.e., $R_1$ is a $C_{17}H_{33}$ alkene tail group in the above formula). Mirataine BET-O-30™ is supplied as a solution having about 30% active surfactant; the remainder is substantially water, sodium chloride, and propylene glycol.

An analogous material, BET-E-40, is also available from Rhodia and contains a erucic acid amide group ($R_1$ is a $C_{21}H_{41}$ alkene tail group in the above formula), and is supplied as a solution having about 40% active ingredient, with the remainder substantially water, sodium chloride, and isopropanol. The surfactant BET-O-30 and the surfactant BET-E-40 are shown below. BET surfactants, and others, are described in U.S. Pat. No. 6,258,859.

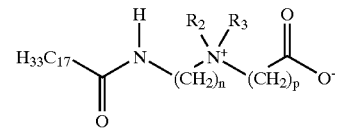

BET-O-30 (when n = 3, p = 1, $R_2$ and $R_3$ = 1)

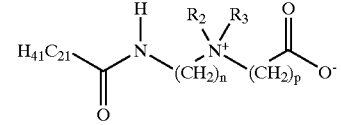

BET-E-40 (when n = 3, p = 1, $R_2$ and $R_3$ = 1)

In preferred embodiments, cosurfactants may be used in addition to VES as part of the VDA. One suitable cosurfactant (shown below) is sodium dodecylbenzene sulfonate (SDBS). In addition, other suitable additives may be added to BET-O-30 or BET-E-40. These additives include certain chelating agents such as trisodium hydroxyethylethylenediamine-triacetate.

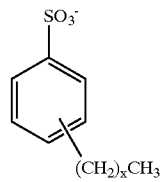

SDBS (when x = 11 and the counterion is Na$^+$)

Other suitable cosurfactants include the class of benzene sulfonates that are shown above in which x=5–15; preferred cosurfactants are those having x=8–12. Cosurfactants are more commonly used with BET-O-30 and are generally not needed with BET-E-40, but any of the suitable betaines can be used with or without cosurfactants.

Further, in embodiments of the present invention, the scale inhibitor comprises at least one compound selected from the classes of phosphate esters, phosphonates, phosphonate polymers, polycarboxylates, and phosphorous containing polycarboxylates. It has been discovered that the use of these scale inhibitors allows the stimulation and placement of scale inhibitors in a single step. Moreover, it has been discovered that the use of a VDA (as described above) mixed with this type of scale inhibitor results in a reservoir treatment fluid that can be mixed with a variety of additives, and works under a wide range of temperatures. The scale inhibitor, may include functionalities in addition to the compounds listed above. In particular, functionalities such as amines may be present in the members of the classes listed earlier.

The polymeric and phosphorous type scale inhibitors described above are optimally used in brines having pH values between 5.0–8.5. On either side of this pH range, the effectiveness of these scale inhibitors decreases. However, they may be used at a variety of temperatures and pH ranges.

In a typical acid treatment of a carbonate reservoir, a pickling fluid containing acid, iron control agent(s) and corrosion inhibitor(s) is first pumped down a well to clean up surface and wellbore tubulars. A spear head acid is then pumped to establish injectivity into the formation. This is followed with the treatment fluid of the invention, containing VES surfactant, scale inhibitor(s) and acid (but not HF). A post-flush fluid, typically a brine solution, is injected last. In a typical acid treatment of a sandstone formation, a pickling fluid containing acid, iron control agent(s) and corrosion inhibitor(s) is first pumped into a well to clean up surface and wellbore tubulars. A pre-flush fluid, typically 3–5% by weight NH$_4$Cl is then injected into the formation. This is then followed with another pre-flush fluid, which may be a fluid of the invention containing VES surfactant, scale inhibitor and acid other than HF, which is followed with a main treatment fluid that is typically a fluid of the invention that contains VES surfactant, scale inhibitor and acid (that typically contains HF). A post-flush fluid (3–5% by weight NH$_4$Cl) is injected during the last stage of treatment.

In a first embodiment, a reservoir treatment fluid was formed by mixing 7.5% by weight of a scale inhibitor into a solution containing 15% weight of 10 molar HCl, 7.5% volume of BET-E-40, and 2% by weight potassium bromide, the balance being water. This reservoir treatment fluid is referred to herein as Formulation 1.

In this particular embodiment, the scale inhibitor was a solution purchased under the name L065 from ONDEO Nalco, of Naperville, Ill., USA. This scale inhibitor includes approximately 10–20% by weight of ethylene glycol, <1% diethylene glycol, 40–60% water, 1–5% calcium chloride, and 40–60% by weight of a blend of phosphorous-containing polycarboxylate. The ability of the reservoir treatment fluid to survive in a formation at 150° F. (~51° C.) was then investigated.

To test compositions of various embodiments of the invention, the effect of a reservoir treatment fluid formed in accordance with the present invention was measured on a sandstone core. One suitable method of testing involves running tests of durations ranging from 30 seconds to 48 hours in an API standard high pressure high temperature (HPHT) apparatus (an example: API 13-B1 with one modification: substituting a sandstone core).

The HPHT apparatus was operated at 1000 psi differential pressure. In general, for testing purposes, sandstone core was saturated with a 2% brine solution for approximately thirty minutes. The weight of the sandstone core was measured before and after saturation to give an estimate of the pore volume. The sandstone core was loaded into the HPHT apparatus, which was then pressurized and heated to a predetermined temperature.

Formulation 1 was then loaded into an accumulator. The entire system was then pressurized, including the accumulator. The initial permeability of the sandstone core was measured with 2% KCl having a nominal flow rate of 5 ml/min. The flow rate was then reduced to 2.5 ml/min to verify the permeability. Formulation 1 was then injected into the core at a flow rate of 5 ml/min until break through occurred. Once break through occurred, the apparatus was left pressurized, but no additional fluid was added. The "shut in" procedure lasted 4 hours. At the end of the 4 hour period, 2% KCl was again injected into the apparatus at 5 ml/min to a total volume of approximately 100 pore volumes (PV), while fractions (called "wash out" fractions) of the effluents were collected.

The core was then retrieved and weighed to determine how much rock dissolved. Collected samples were then analyzed for phosphorous. The collected samples were measured using Inductively Coupled Plasma Optical Emission Spectroscopy (ICP). No limitation on the scope of the present invention is intended by the discussion of the above testing method.

FIG. 1 shows a plot of scale inhibitor concentrations in various wash out fractions (measured by monitoring phosphorus) versus total fluid volume for Formulation 1 measured at 150° F. (~51° C.). As the amount of brine washed over the adsorbed scale inhibitor increased, the amount of scale inhibitor remaining on the sandstone core decreased. FIG. 1 illustrates that a measurable amount of scale inhibitor remained, even after flowing large volumes (100 PV) of brine over the sandstone core. The "MIC" designated in the legend of FIG. 1 refers to the minimum effective inhibition concentration. The scale inhibitor concentration remained above the MIC.

Figure 2:
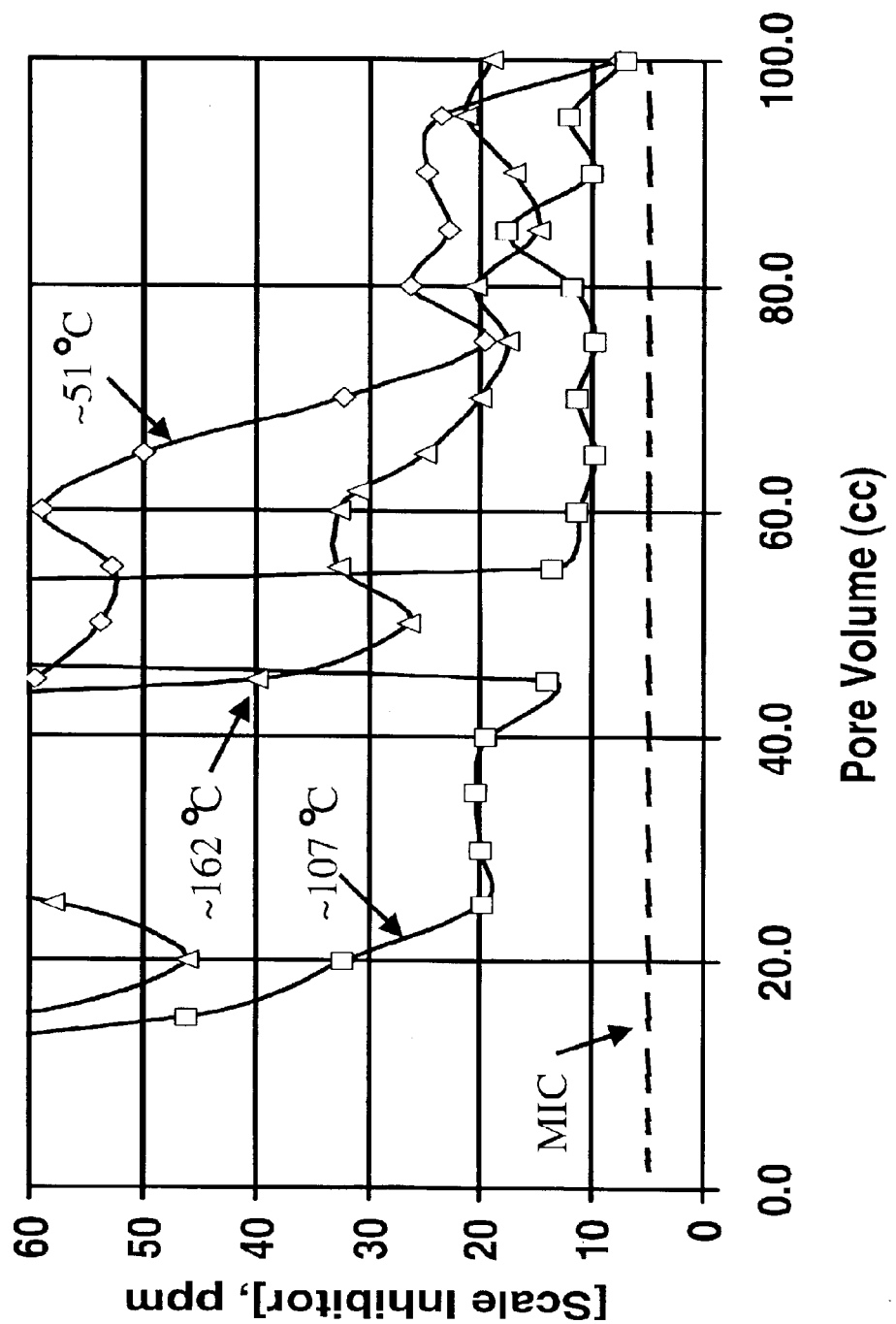
FIG. 2 shows a plot of scale inhibitor concentration versus total fluid volume at different temperatures for a fluid in accordance with one embodiment of the present invention.

FIG. 2 is similar to FIG. 1, and uses Formulation 1, but illustrates the temperature stability of fluids formulated in accordance with the present invention. In FIG. 2, data were collected at 150° F. (~51° C.), 250° F. (~107° C.), and 350° F. (~162° C.). In FIG. 2, the "MIC" is the minimum effective inhibition concentration. FIG. 2 shows that even at higher temperatures, scale inhibitor remained. FIGS. 1 and 2, therefore, show that even in high temperature applications, reservoir treatment fluids formulated in accordance with the present invention can serve as scale inhibitors.

Figure 3:
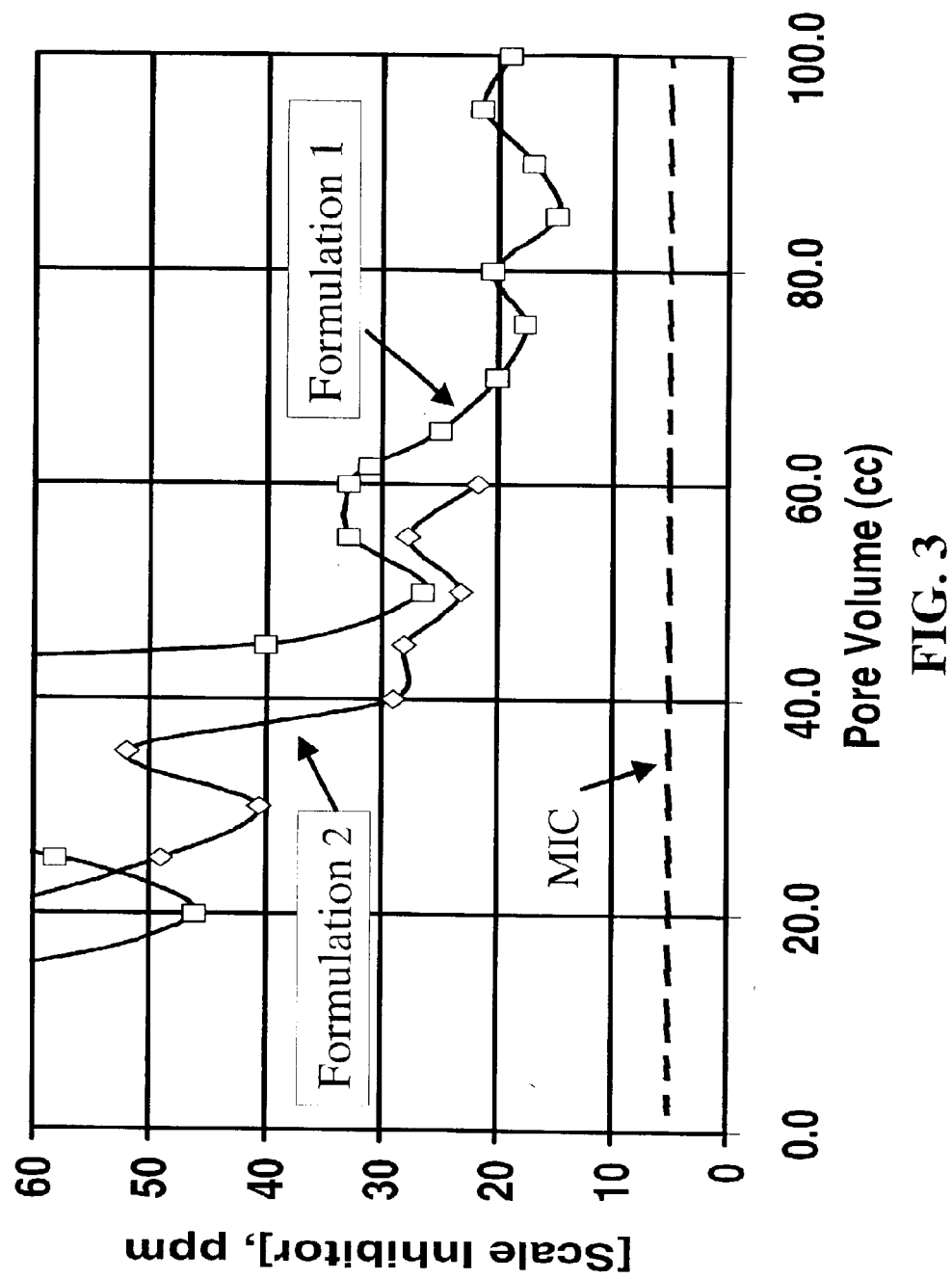
FIG. 3 shows a plot of scale inhibitor concentration versus total fluid volume for a fluid in accordance with another embodiment of the present invention.

In another embodiment of the present invention, Formulation 2, a reservoir treatment fluid included 7.5% by volume of BET-E-40, 7.5% weight of a suitable scale inhibitor, 50% weight of EDTA (ethylenediaminetetraacetic acid, a chelating agent, previously adjusted to pH 4), and 2% by weight KCl. In this particular embodiment, the scale inhibitor was a solution purchased under the name L065 by ONDEO Nalco, of Naperville, Ill., USA. This scale inhibitor includes approximately 10–20% by weight of ethylene glycol, <1% diethylene glycol, 40–60% water, 1–5% calcium chloride, and 40–60% by weight of a blend of phosphorous-containing polycarboxylate. The usefulness of the fluid as a scale inhibitor was measured as in the above example. FIG. 3 shows the results of a test that was run at 350° F. FIG. 3 also includes a similar test for Formulation 1. The points indicated by squares refer to Formulation 1, while the diamonds refer to Formulation 2. Similar to the results indicated in FIGS. 1 and 2, significant amounts of phosphorous remained even at high volumes of wash fluid.

Further, the compatibility of reservoir treatment fluids formulated in accordance with the present invention with 2000 ppm of $Fe^{3+}$ was investigated. In order to investigate the compatibility, a solution of 2000 ppm of $Fe^{3+}$ ($FeCl_3 \cdot 6H_2O$), 7.5% weight scale inhibitor, 10% volume BET-E-40, and 15% by weight 10 M HCl was prepared. In this particular embodiment, the scale inhibitor was a solution purchased under the trade name L065 by ONDEO Nalco, of Naperville, Ill. This scale inhibitor includes approximately 10–20% by weight of ethylene glycol, <1% diethylene glycol, 40–60% water, 1–5% calcium chloride, and 40–60% by weight of a blend of phosphorous-containing polycarboxylate.

The resulting mixture was allowed to stand for 24 hours. The mixture was filtered, and the filtrate was analyzed using ICP to determine the amount of iron present in the filtrate. The solids produced from the filtration were allowed to dry. The solids were then weighed. Again, no limitation on the scope of the invention is intended by the above testing method. A variety of fluid compositions (i.e., having varying amounts of scale inhibitor, using a variety of acids, and different molarities of acids) was tested. It was found that the reservoir treatment fluids formulated in accordance with the present invention were compatible and stable in the presence of $Fe^{3+}$.

In addition, a series of tests was performed to determine the stability and compatibility of typical acid additives with the above described reservoir treatment fluids. In this procedure, one hundred ml of a suitable reservoir treatment fluid and an acid additive were blended in a glass bottle. Typical acid additives include corrosion inhibitors, iron control additives, de-emulsifiers and/or anti-sludge additives, and other additives. Fluid compatibility tests were then conducted with stable acid systems.

The fluid compatibility tests roughly follow the method of API RP42, but the acid was deliberately contaminated with 2500 ppm ferric iron. It was found that the reservoir treatment fluids formulated according to the present invention were stable with respect to a variety of common additives. Table 1 lists exemplary additives that have been tested and found to be compatible with fluids of the present invention.

TABLE 1

Exemplary List of Additives

| Concentration | Additive |
|---|---|
| 0.5% | Formic Acid |
| 0.8% | Ammonium Thioglycolate, 71% (60% TGA) |
| 0.5% | Organic Carboxylic acid |
| 65 ppt | Tetrasodium EDTA |
| 5.0% | Ethylene glycol monobutyl ether |
| (20, 15, 12, 7.5, 1 & 0.75)% | HCL |

In addition, the effect of scale inhibitors on spent VDA fluid was investigated. The fluid was spent with calcium carbonate until the pH was reduced to about 5. VDA relies on viscosity for diversion so it is important that reservoir treatment fluids formulated in accordance with the present invention demonstrate good rheology over a wide temperature range: it is preferred that a minimum viscosity of 50 cp at 100 $S^{-1}$ is maintained to achieve diversion.

Figure 4:
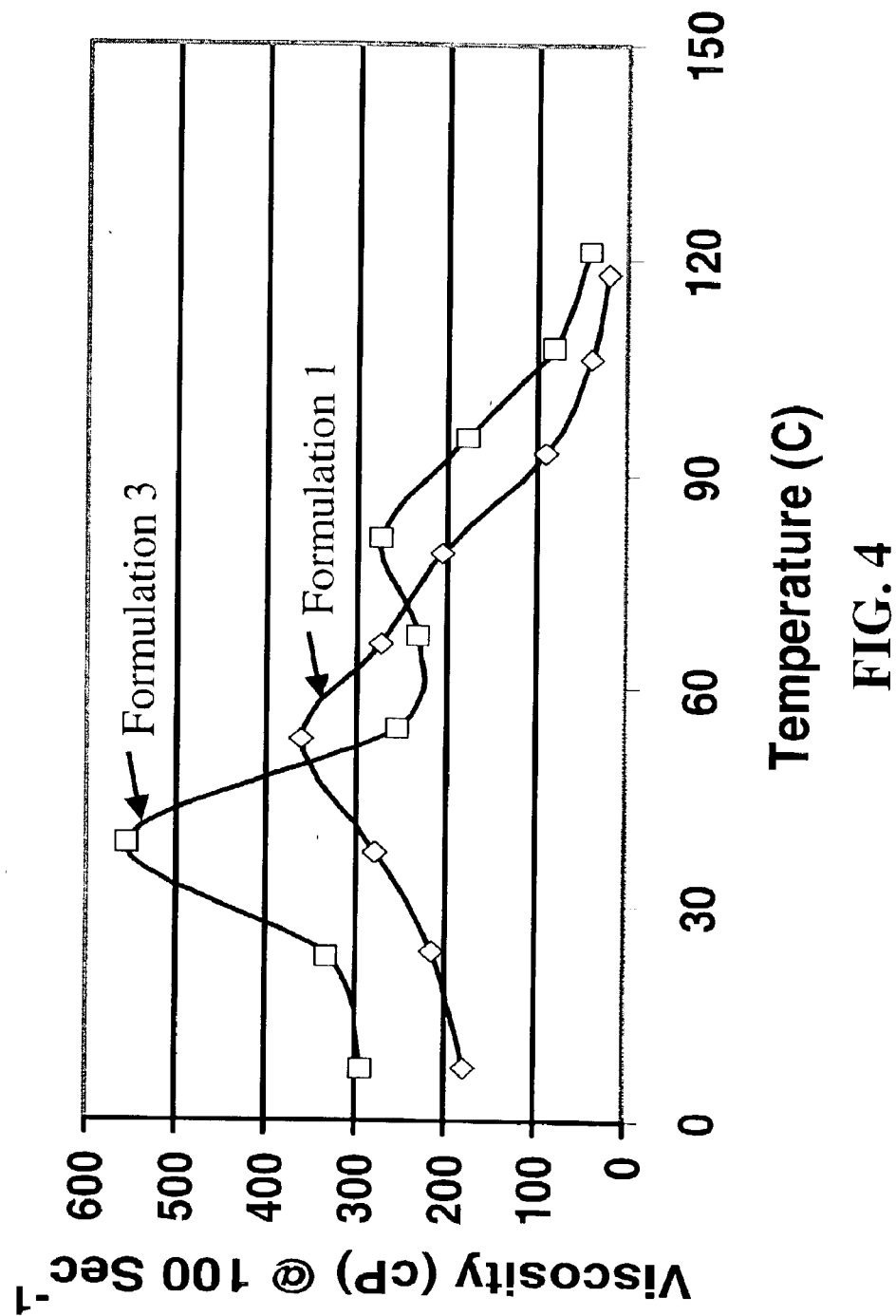
FIG. 4 shows a plot of the effect of sample scale inhibitors on spent VDA rheology, in accordance with one aspect of the present invention.

FIG. 4 shows the effect of scale inhibitors used in the present invention on VDA rheology. As can be seen from FIG. 4, sufficient viscosity remained, even at temperatures in excess of 250° F. (~107° C.). Points indicated by the squares in FIG. 4 represent a reservoir treatment fluid, Formulation 3, which comprises 7.5% by volume BET-E-40, 15% by weight spent 10 M HCl, and 7.5% by weight of a polymeric scale inhibitor. In this embodiment, the polymeric scale inhibitor may be purchased from Baker Petrolite, Sugar Land, Tex., USA. under the name SCW263. Points indicated by triangles in FIG. 4 represent a sample of Formulation 1.

Furthermore, it should be noted that while the above examples discuss the utility of VES in KCl containing brine solutions, it will be clear to one of ordinary skill in the art that other brine solutions, such as $ZnCl_2$, $CaCl_2$, $ZnBr_2$, NaCl, $CaBr_2$, $NH_4Cl$, $MgCl_2$, seawater, NaBr, $Na_2S_2O_3$, tetramethyl ammonium chloride, sodium acetate, sodium formate, potassium acetate, potassium formate, and combinations thereof, may be used. In addition, some embodiments of the invention may include no such salts.

In addition, while specific amounts of the chemicals used are described in the above embodiments, it is specifically within the scope of the invention that amounts different from those described above may be used to provide the desired scale inhibition, depending on the particular application. For example, in exemplary embodiments, a suitable reservoir treatment fluid may comprise about 0.7%–20% by weight scale inhibitor, 1–20% by volume VES, and 1–30% by weight acid. In preferred embodiments, a reservoir treatment fluid formulated in accordance with the present invention may comprise 0.7%–20% by weight scale inhibitor, 5–10% by volume VES, and 1–28% by weight acid.

Furthermore, while the above embodiments describe VDA/phosphonate solutions for use as a stimulation/scale inhibitor, the solutions may be used for other applications. One of ordinary skill in the art, having reference to this disclosure would recognize these applications without having to perform undue experimentation.

Embodiments of the present invention provide advantages over prior art reservoir treatment fluids and in particular, prior art stimulation and scale inhibition fluids. Embodiments of the present invention disclose a simple system that can achieve acid treatment and scale inhibition in a single step, as compared to the multiple steps required by prior art procedures. Furthermore, embodiments of the present invention advantageously provide a reservoir treatment fluid that is compatible with a wide variety of additives under a wide range of conditions (e.g., temperature).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A reservoir treatment fluid for use in a hydrocarbon-containing formation comprising:

a self-diverting acid, wherein the self diverting acid comprises:

about 1% to 30% by weight of at least one acid selected from the group consisting of hydrochloric acid, sulfuric acid, phosphoric acid, formic acid, acetic acid, citric acid, maleic acid, hydrofluoric acid and mixtures thereof; and about 1% to 20% by volume of at least one viscoelastic surfactant selected from a family of compounds described by

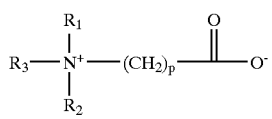

where $R_3$ contains at least 10 carbon atoms, $p=1–6$, $R_2$ contains 1–6 carbon atoms and $R_1$ contains 1–6 carbon atoms; and about 0.7% to 20% by weight scale inhibitor, said fluid not comprising a member selected from the group consisting of co-surfactants and chelating agents.

2. The reservoir treatment fluid of claim 1, wherein the scale inhibitor is selected from the group consisting of phosphate esters, phosphonates, polycarboxylates, phosphonate polymers, phosphorous containing polycarboxylates, and mixtures thereof.

3. The reservoir treatment fluid of claim 1, wherein the viscoelastic surfactant is a compound described by

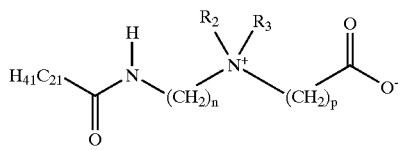

wherein $n=2–10$, $p=1–6$, and $R_2$ and $R_3$ contain 1–6 carbon atoms.

4. The reservoir treatment fluid of claim 3, wherein the viscoelastic surfactant comprises

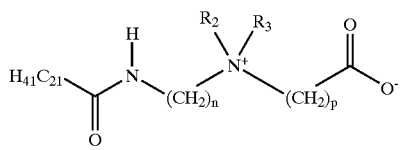

and $n=3$ and $p=1$, and $R_2$ and $R_3=CH_3$.

5. The reservoir treatment fluid of claim 1, wherein the viscoelastic surfactant comprises a compound described by

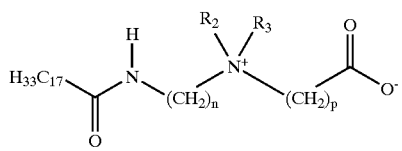

wherein $n=2–10$, $p=1–6$, and $R_1$ and $R_2=1–6$ carbon atoms.

6. A method of treating a hydrocarbon-containing formation comprising:

injecting a well treating fluid into a well, wherein the well treating fluid comprises a self-diverting acid, wherein the self diverting acid comprises:

about 1% to 30% by weight of at least one acid selected from the group consisting of hydrochloric acid, sulfuric acid, phosphoric acid, formic acid, acetic acid, citric acid, maleic acid, hydrofluoric acid and mixtures thereof; and about 1% to 20% by volume of at least one viscoelastic surfactant selected from a family of compounds described by

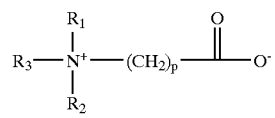

where $R_3$ contains at least 10 carbon atoms, $p=1–6$, $R_2$ contains 1–6 carbon atoms and $R_1$ contains 1–6 carbon atoms; and about 0.7% to 20% by weight scale inhibitor, said fluid not comprising a member selected from the group consisting of co-surfactants and chelating agents.

7. The method of claim 6, wherein the scale inhibitor is selected from the group consisting of phosphate esters, phosphonates, phosphonate polymers, polycarboxylates, phosphorous containing polycarboxylates, and mixtures thereof.

8. The method of claim 6, wherein the viscoelastic surfactant comprises a compound described by

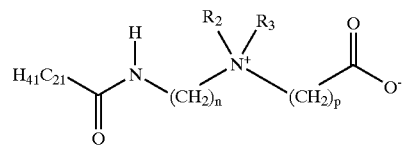

wherein $n=2–10$, $p=1–6$, and $R_2$ and $R_3$ contain 1–6 carbon atoms.

9. The method of claim 8, wherein the viscoelastic surfactant comprises

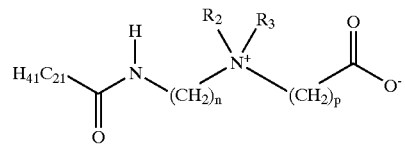

and $n=3$ and $p=1$, and $R_2$ and $R_3=CH_3$.

10. The method of claim 6, wherein the viscoelastic surfactant comprises a compound described by

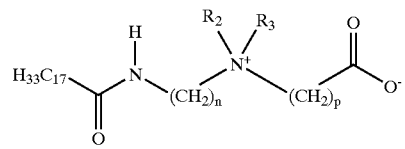

wherein $n=2–10$, $p=1–6$, and $R_1$ and $R_2=1–6$ carbon atoms.

* * * * *